(12) United States Patent
Duchardt et al.

(10) Patent No.: US 12,554,276 B2
(45) Date of Patent: Feb. 17, 2026

(54) METHOD FOR CONTROLLING A TEMPERATURE OF A LIQUID IN A LIQUID CONTAINER

(71) Applicant: BRITA SE, Taunusstein (DE)

(72) Inventors: Thomas Duchardt, Offenbach (DE); Oliver Machui, Bad Homburg (DE)

(73) Assignee: BRITA SE, Taunusstein (DE)

( * ) Notice: Subject to any disclaimer, the term of this patent is extended or adjusted under 35 U.S.C. 154(b) by 135 days.

(21) Appl. No.: 18/263,463

(22) PCT Filed: Jan. 25, 2022

(86) PCT No.: PCT/EP2022/051541
§ 371 (c)(1),
(2) Date: Jul. 28, 2023

(87) PCT Pub. No.: WO2022/161920
PCT Pub. Date: Aug. 4, 2022

(65) Prior Publication Data
US 2024/0077896 A1 Mar. 7, 2024

(30) Foreign Application Priority Data
Feb. 1, 2021 (EP) .................................... 21154506

(51) Int. Cl.
*G05D 23/19* (2006.01)
*F24H 15/223* (2022.01)
(Continued)

(52) U.S. Cl.
CPC ....... *G05D 23/1919* (2013.01); *F24H 15/223* (2022.01); *F24H 15/248* (2022.01); *F24H 15/31* (2022.01); *F24H 15/355* (2022.01)

(58) Field of Classification Search
CPC ...... F24H 15/132; F24H 15/246; F24H 15/31; F24H 15/355; G05D 23/1919
See application file for complete search history.

(56) References Cited

U.S. PATENT DOCUMENTS 1,170,239 A * 2/1916 Gamble .................... G01F 1/52
73/215
4,978,833 A 12/1990 Knepler
(Continued)

FOREIGN PATENT DOCUMENTS

EP 0526668 A1 * 2/1993

OTHER PUBLICATIONS

Typer523-Metering-Ball-Valve, Fischer (Year: 2012).*

*Primary Examiner* — Steven S Anderson, II
(74) *Attorney, Agent, or Firm* — Colson Law Group, PLLC

(57) ABSTRACT

A method for controlling a temperature of a liquid in a liquid container filled with at least a first predetermined amount of the liquid using a heating device. The temperature of the liquid in the liquid container is measured and controlled by adjusting the heat output of the heating device. If the liquid container is filled with less than the first predetermined amount of liquid until the liquid container is filled with a second predetermined amount of the liquid, wherein the second predetermined amount of the liquid is equal to or greater than the first predetermined amount of the liquid, cool liquid is fed into the liquid container from a liquid reservoir, the heating device is permanently activated, and the temperature of the liquid in the partially filled liquid container is controlled.

9 Claims, 1 Drawing Sheet

(51) Int. Cl.
   *F24H 15/248*   (2022.01)
   *F24H 15/31*    (2022.01)
   *F24H 15/355*   (2022.01)

(56) References Cited

U.S. PATENT DOCUMENTS

| | | |
|---|---|---|
| 5,671,113 A | 9/1997 | Knepler |
| 2007/0261838 A1 | 11/2007 | Chen |
| 2010/0006041 A1* | 1/2010 | Eisenbraun ............ F24H 9/2035 |
| | | 122/17.1 |
| 2011/0311209 A1* | 12/2011 | Bhardwaj ............. F24H 15/281 |
| | | 392/456 |
| 2019/0226699 A1* | 7/2019 | Lundgreen ................ F22B 9/00 |

* cited by examiner

METHOD FOR CONTROLLING A TEMPERATURE OF A LIQUID IN A LIQUID CONTAINER

TECHNICAL FIELD

The invention relates to a method for controlling a temperature of a liquid in a liquid container using a heating device, wherein the temperature of the liquid in the liquid container is measured and controlled by adjusting the heat output of the heating device if the liquid container is filled with at least a first predetermined amount of the liquid.

BACKGROUND OF THE INVENTION

Liquid containers for providing a heated liquid are well-known. For example, boilers for heating water are known from the state of the art, whereby a heating device of the boiler is used and controlled to regulate the water temperature. As heating device electrical heating elements are widely used. For example, it is known to switch the heating device on and off via a two-step control depending on the water temperature measured in the boiler.

After hot water has been taken from the boiler, it is usually refilled with cold tap water. By filling the boiler with cold water and mixing the cold water with the remaining hot water in the boiler, the water in the boiler is cooled down and need to be reheated with the heating device and the well-known two-step control. Especially during the filling process with cold tap water, this control principle does not use the entire available heating power of the heating device, which slows down the heating process and hot water is available later.

Accordingly, there is a need for providing a controlling a temperature of a liquid in a liquid container which allows for a faster heating when filling of the liquid container with cold liquid is in process.

SUMMARY OF THE INVENTION

The present invention relates to a method for controlling a temperature of a liquid in a liquid container as described at the beginning, characterized in that if the liquid container is filled with less than the first predetermined amount of liquid until the liquid container is filled with a second predetermined amount of the liquid, wherein the second predetermined amount of the liquid is equal to or greater than the first predetermined amount of the liquid, cool liquid is fed into the liquid container from a liquid reservoir, the heating device is permanently activated, and the temperature of the liquid in the partially filled liquid container is controlled by adjusting the cool liquid volume flow rate of the cool liquid fed into the liquid container. Thus, during the filling of the liquid container with cool liquid the heating device permanently heats the liquid and the full available heating energy is used. As the temperature of the liquid in the liquid container is controlled by adjusting the amount of cool water fed into the liquid container hot liquid with a temperature in the desired temperature range is faster available and the user of the liquid container needs less waiting until the temperature of the liquid in the liquid container has reached the desired temperature. After the filling process is completed and the liquid container is filled with the second predetermined amount of the liquid, the temperature of the liquid is again controlled via the well-known adjustment of the heat output of the heating device.

Thus, in the method according to the invention, two control methods are used to control the temperature of the liquid in the liquid container, whereby switching between the control methods is dependent on the filling level of the liquid container. During filling the liquid container with cold liquid, the temperature is controlled by adjusting the volume flow of cold liquid into the liquid container. When the filling is completed and the volume flow of cold liquid into the liquid container is zero, the temperature is controlled by the heating device.

The liquid reservoir advantageously provides the liquid under pressure. However, it is also possible to use a pump to supply the liquid from the liquid reservoir into the liquid container or from the liquid container into a vessel like e.g. a pot, a cup or a glass.

If an additional pump is used to supply the cool liquid from the liquid reservoir into the liquid container, the cool liquid volume flow rate of the cool liquid can easily be controlled by adjusting the pump speed. Particularly, if a rotary piston pump is used, the flow rate of the pump can be adjusted by changing the rotational speed of the pump.

According to an advantageous embodiment of the invention, the cool liquid volume flow rate is adjusted by controlling a metering valve which is arranged in the fluid connection between the liquid reservoir and the liquid container. As metering valve a solenoid valve may be used, which can be controlled by adjusting the supply current or voltage of the valve by a controller. The opening of the metering valve and thus the volume flow rate through the valve is advantageously controlled by a pulse wide modulated supply current or voltage. The use of a metering valve is especially advantageous if the liquid in the liquid reservoir is at a higher pressure than the liquid in the liquid container, e.g. if a boiler as liquid container is connected to a fresh water pipe of a public water supply. However, it can also be used in addition to a pump. The metering valve may then be installed either between the liquid reservoir and the pump or between the pump and the liquid container.

It is regarded as an essential aspect of the present invention that a filling level of the liquid container is measured. For measuring the filling level e.g. float switches or electrodes may be used which are arranged at different heights within the liquid container.

In accordance with a particularly advantageous embodiment of the invention, if the temperature is controlled by adjusting the heat output of the heating device, the heating device is activated when the measured temperature falls below a predetermined activation temperature and wherein the heating device is deactivated when a predetermined deactivation temperature is reached. The predetermined activation temperature is lower than the deactivation temperature. The use of such a two-step control is well-known and very easy to set-up.

As a safety measure it is advantageous that the heating device is switched off if the liquid container is filled with a third predetermined amount of the liquid. The third predetermined amount of the liquid is lower than the first and second predetermined amount and correspond to a filling level at which the heating device may damage the liquid container, because e.g. heating rods of the heating device are no longer covered by the liquid.

In yet another aspect of the invention the liquid is fresh water, the liquid reservoir is a fresh water line and the liquid container is a boiler. The described method is particularly useful for the operation of fresh water boilers, e.g. for households.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings are referred to by the same reference numerals.

In FIGS. 1a and 1b a liquid container 1 is shown. The liquid container 1 comprises heating device 2 for heating a liquid 3 in the liquid container 1. The liquid container 1 is connected to a fresh water pipe 4 of a public water supply via a metering valve 5. An opening area of the metering valve can be controlled via a controller 6. A heat output of the heating device can be controlled via a controller 7. Heated liquid 3 can be taken from the liquid container 1 via a tap 8 by operating a tapping valve 9.

The temperature of the liquid 3 in the liquid container 1 is measured by a temperature sensor 10. The filling level of the liquid 3 contained in the liquid container 1 is also measured by sensor, not shown in the FIGS.

Figure 1A:
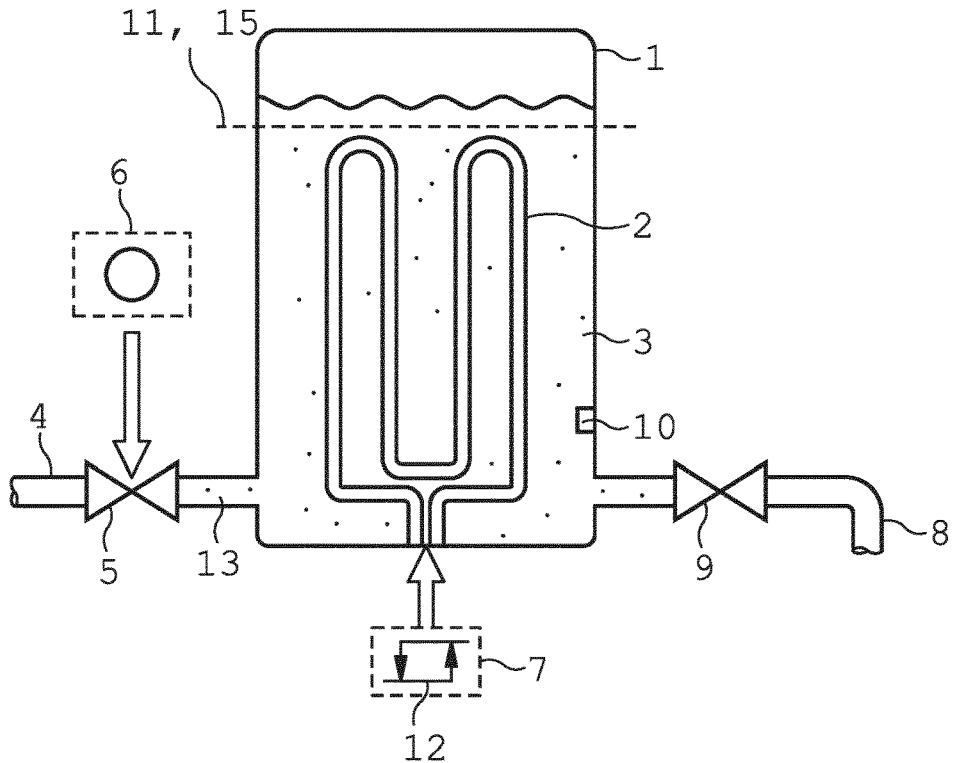
FIGS. 1a and 1b illustrate a schematic representation of the method according to the invention.

A water level of the liquid 3 in the liquid container 1 as shown in FIG. 1a is above of a first predetermined amount 11 of the liquid 3. The temperature of the liquid 3 in the liquid container 1 is controlled by adjusting the heat output of the heating device 2 using a two-step-control-algorithm 12. The metering valve 5 is shut.

Figure 1B:
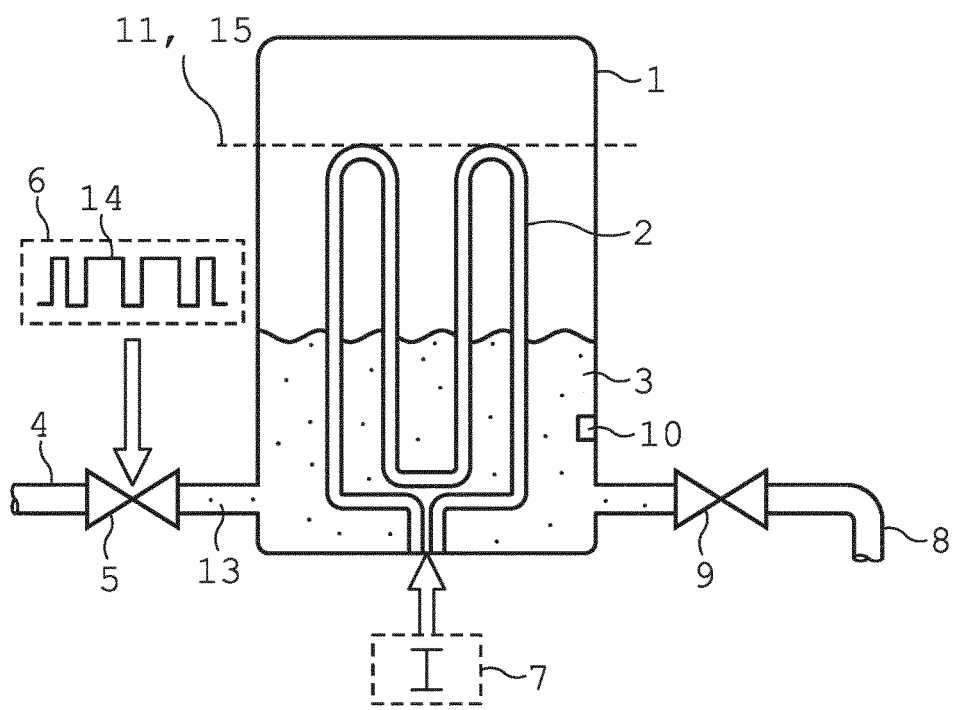

If the liquid container 1 is filled with less than the first predetermined amount 11 of liquid 3 as shown in FIG. 1b, cool liquid 13 is fed into the liquid container 1 from the fresh water pipe 4. The heating device 2 is permanently activated, and the temperature of the liquid 3 in the partially filled liquid container 1 is controlled by adjusting the cool liquid volume flow rate of the cool liquid 13 fed into the liquid container 1 by controlling the opening area of the metering valve 5 using a pulse-width-modulated-control-signal 14. The temperature is controlled by the metering valve 5 until the liquid container 1 is filled with a second predetermined amount 15 of the liquid 3, wherein the second predetermined amount 15 of the liquid 3 is equal to the first predetermined amount 11 of the liquid 3.

The invention claimed is:

1. A method for controlling a temperature of a liquid in a liquid container using a heating device, wherein the temperature of the liquid in the liquid container is measured and controlled by adjusting the heat output of the heating device if the liquid container is filled with at least a first predetermined amount of the liquid, wherein if the liquid container is filled with less than the first predetermined amount of the liquid, a cool liquid is fed into the liquid container from a liquid reservoir until the liquid container is filled with a second predetermined amount of the liquid, wherein the second predetermined amount of the liquid is equal to or greater than the first predetermined amount of the liquid, wherein if the liquid container is filled with less than the first predetermined amount of the liquid and until the liquid container is filled to the second predetermined amount of the liquid, the heating device is constantly activated, and the temperature of the liquid in the partially filled liquid container is controlled by adjusting the cool liquid volume flow rate of the cool liquid fed into the liquid container.

2. The method according to claim 1, wherein the cool liquid volume flow rate is adjusted by controlling a metering valve which is arranged in the fluid connection between the liquid reservoir and the liquid container.

3. The method according to claim 1, wherein a filling level of the liquid container is measured.

4. The method according to claim 1, wherein if the temperature is controlled by adjusting the heat output of the heating device, the heating device is activated when the measured temperature falls below a predetermined activation temperature and wherein the heating device is deactivated when a predetermined deactivation temperature is reached.

5. The method according to claim 1, wherein the heating device is switched off if the liquid container is filled with a third predetermined amount of the liquid.

6. A method for controlling a temperature of a liquid in a liquid container using a heating device, wherein the temperature of the liquid in the liquid container is measured by a temperature sensor and controlled by adjusting the heat output of the heating device if the liquid container is filled with at least a first predetermined amount of the liquid, wherein if the liquid container is filled with less than the first predetermined amount of liquid, a cool liquid is fed into the liquid container from a liquid reservoir through a metering valve controlled by a pulse-width modulated (PWM) signal until the liquid container is filled with a second predetermined amount of the liquid, wherein the second predetermined amount of the liquid is equal to or greater than the first predetermined amount of the liquid, wherein if the liquid container is filled with less than the first predetermined amount of the liquid and until the liquid container is filled to the second predetermined amount of the liquid, the heating device is constantly activated, and the temperature of the liquid in the partially filled liquid container is controlled by adjusting the cool liquid volume flow rate of the cool liquid fed into the liquid container by controlling the opening area of the metering valve with the PWM signal.

7. The method according to claim 6, wherein the metering valve which is arranged in the fluid connection between the liquid reservoir and the liquid container.

8. The method according to claim 6, wherein the heating device is switched off if the liquid container is filled with a third predetermined amount of the liquid.

9. The method according to claim 8, wherein the third predetermined amount of the liquid is less than one or more of the first predetermined amount of liquid or the second predetermined amount of liquid.

* * * * *